*INVENTORS*
*ROBERT CARRUTHERS*
*DAVID LORIMER SMART*

BY

INVENTORS
ROBERT CARRUTHERS
DAVID LORIMER SMART
BY
Larson and Taylor

INVENTORS
ROBERT CARRUTHERS
DAVID LORIMER SMART
BY

United States Patent Office 3,191,074
Patented June 22, 1965

3,191,074
ENERGY TRANSFER CIRCUITS PARTICULARLY FOR THE TRANSFER FROM AN INDUCTIVE STORE TO AN INDUCTIVE LOAD
Robert Carruthers, Abingdon, and David Lorimer Smart, Wantage, England, assignors to United Kingdom Atomic Energy Authority, London, England
Filed Mar. 23, 1960, Ser. No. 17,064
Claims priority, application Great Britain, Mar. 25, 1959, 10,376/59; Mar. 26, 1959, 10,502/59
2 Claims. (Cl. 307—104)

This invention relates to energy transfer circuits and relates particularly to circuits for the transfer of energy from an inductive store to an inductive load.

An example of the kind of load to which such circuits are applicable is described in the specification of copending application Serial No. 692,500, filed October 25, 1957, now Patent Number 3,054,742. The load in that case consists of a gas discharge apparatus comprising a transformer whose secondary winding is constituted by a pinched ring discharge induced in gas in a toroidal vessel.

In the above-mentioned apparatus the electrical energy for energising the discharge is stored in a capacitor bank which is discharged through the transformer primary winding. An alternative is to store the energy in an inductor. The cost of energy storage by capacitors is directly proportional to the energy stored (neglecting secondary factors such as manufacturing savings on large quantities), whereas the cost of storage in an inductor does not increase in proportion to the energy stored. For storing large amounts of energy of the order of 100–200 megajoules (mj.) a capacitative store may be several times as expensive as an inductive store, the exact figure varying in a complicated way depending on the tolerable losses in the system during "charging" of the inductor, i.e., while building up the current therein. These losses will determine the relative sizes and costs of the inductor and its charging supply. The losses in the system will also depend on the time taken for the energy transfer, and for an inductor time-constant (L/R) of about 2–5 seconds (an economic value for a 200 mj. system), the energy transfer should be complete in one second or less from the completion of charging if the efficiency of the system is to be reasonably good.

The use of inductive storage to feed a resistive load has been described by Early and Walker in AIEE Paper 57-59 (Trans. A.I.E.E., vol. 76, pt. 1, p. 320, July 1957) and in Rev. Sci. Instrum. vol. 29, p. 1020, November 1958. With the circuits described therein it can be shown that while the energy transfer to a predominantly resistive load can be substantially loss-free, the transfer to a predominantly inductive load involves a substantial loss of energy. It is an object of the present invention to provide a more efficient circuit for transferring energy to an inductive load.

According to the present invention an energy transfer circuit comprises a storage inductor, source means connectable across the storage inductor for charging the storage inductor, first switch means connected to short-circuit said storage inductor when said storage inductor has been charged, an inductive load, a capacitor, means for connecting selectively said inductive load and the capacitor in parallel to form a resonant circuit, said connecting means including second switch means for isolating the capacitor from the inductive load and third switch means for isolating said inductive load from said storage inductor when said storage inductor is being charged, and control means for operating said switch means so that when said storage inductor is charged said first switch means is opened and said third switch means is then closed thereby transferring energy to the inductive load.

To enable the nature of the invention to be more readily understood, attention is directed to the accompanying drawings wherein.

Figure 1:
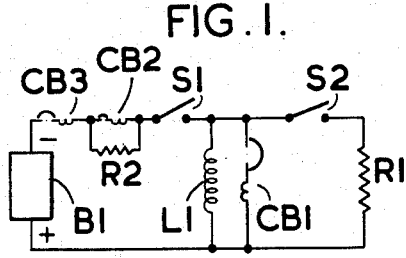
FIGS. 1 and 1(a) show respectively a modified form of a known circuit for transferring energy from an inductive store to a resistive load and a graph of waveforms in the circuit.

FIG. 1 shows a circuit similar in principle to that described by Early and Walker in the aforementioned papers. A D.C. source B1 is connectable across a storage inductor L1 through circuit-breaker switches CB3 and CB2, and isolating switch S1 in series. A resistive load R1 is connectable across L1 through a switch S2 and a circuit-breaker switch CB1 is connected across L1. A resistor R2 is connected across CB2.

To charge the inductor L1, switches CB3, CB2 and S1 are closed, CB1 and S2 being open. When the current in L1 has reached the required value CB2 is opened, thus introducing R2 into the charging circuit so that the voltage across L1 is reduced approximately to zero. The circuit-breaker CB1 is now closed, following which the circuit-breaker CB3 is opened to break the charging circuit and S1 subsequently opened to isolate the inductor L1 from the charging circuit.

Figure 1A:
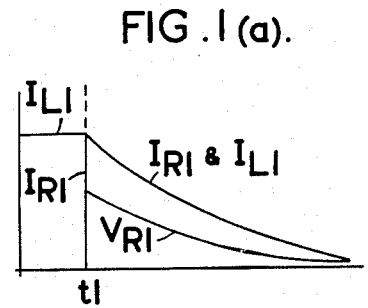

The above switching sequence leaves the inductor L1 charged with a current $I_{L1}$ which is flowing through CB1. To discharge the inductor into the load R1, S2 is first closed and then CB1 opened at time $t1$ in FIG. 1(a). The current flowing in L1 is thus diverted into the load R and decays with a time-constant L1/R as shown by the load current and voltage waveforms $I_{R1}$ and $V_{R1}$ respectively in FIG. 1(a). Provided the rate of increase of resistance in CB1 is sufficiently great, very little of the stored energy need be lost in the circuit-breaker. Nor is the efficiency appreciably affected by the presence of a small amount of inductance in the load.

The inductor charging arrangement in the above circuit differs slightly from that of Early and Walker in that the D.C. source is connected in parallel with the storage inductor and load, rather than in series therewith, but the principle of operation is the same.

Figure 2:
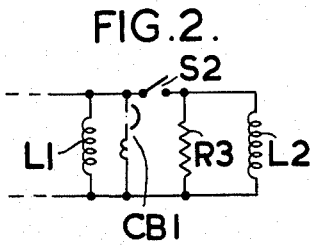
FIGS. 2 and 2(a) are similar to FIGS. 1 and 1(a) with the difference that the load is primarily inductive.
Figure 2A:
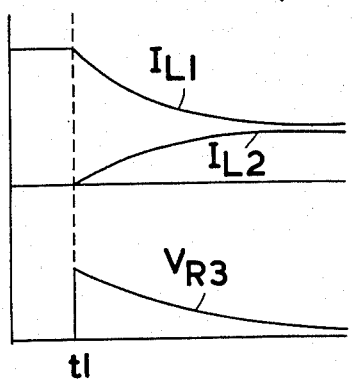

In the circuit of FIG. 2 the charging circuit has been omitted for clarity and the now primarily inductive load represented by an inductor L2. A resistor R3 is connected in parallel with L2 to limit the circuit voltage to a finite value when CB1 is opened. Under these conditions it can be shown that $$\frac{\text{Energy lost}}{\text{Enery transferred}}=1+\frac{L2}{L1}$$

where L2 and L1 represent the actual values of inductance of the inductors.

Thus if for example $L1=L2$, ½ the energy is dissipated in R3, ¼ is transferred to the load L2 and ¼ is left in the inductive store L1. This is true whether R3 is fixed or variable, or is merely the arc resistance of the circuit-breaker CB1.

Figure 3:
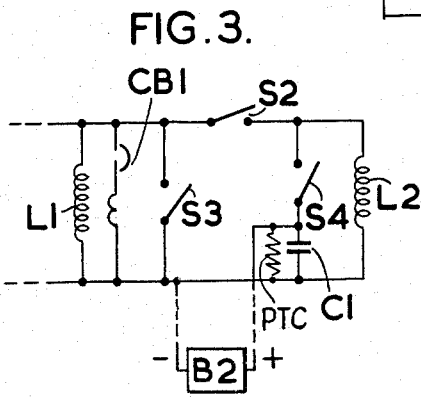
FIGS. 3 and 3(a) show respectively a circuit embodying the present invention and a graph of waveforms in the circuit.
Figure 3A:
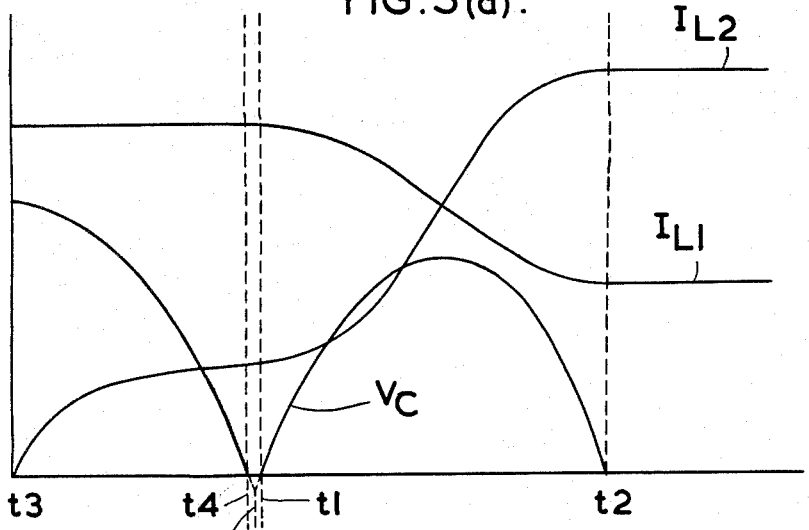

In the circuit of FIG. 3, which embodies the present invention, a capacitor C1 (constituting a first capacitor) is connected across the load inductor L2 through a switch S4 (constituting a second switch means), and is initially charged from a source B2. A switch S3 is connected in parallel with CB1. FIG. 3(a) shows the sequence of operation. Assuming the inductor L1 to have been charged to a current $I_{L1}$ as described with reference to FIGS. 1 and 2, S4 is closed at time $t3$ and C1 discharges through L2, building up a current $I_{L2}$ therein which is less than $I_{L1}$. When the voltage on C1 has fallen approximately to zero, at time $t4$, switch S2 (constituting a third switch means) is closed, and the current $I_{L2}$ is diverted through CB1 (constituting with S3 a first switch means), which now carries a net current $I_{L1} - I_{L2}$. Immediately thereafter, at time $t1$, CB1 is opened and the currents $IL_1$ and $IL_2$ and voltage $V_C$ across C1 vary as shown. At the conclusion of a half-cycle of the resonant circuit formed by L1 and L2 in parallel with C1, i.e. at time $t2$, switch S3 is closed. It will be seen that this closure leaves the current in L2 enhanced, and that in L1 correspondingly reduced to a value which is less than that in L2, i.e. a higher proportion of the available energy in L1 has been extracted than was possible for the same ratio of L1 to L2 in the circuit of FIG. 2. Moreover this energy transfer has been accomplished in a substantially loss-free manner.

The transfer of energy from L1 to L2 need not have been preceded by discharging C1 through L2 to build up the current $I_{L2}$ therein. C1 could have been connected directly across L2 (S4 and B2 being omitted), and remained uncharged until time $t1$, the initial current $I_{L2}$ in this case being zero. However since C1 must be provided for transferring the energy from L1 to L2, it can conveniently be used also as a capacitative store providing an additional contribution to the final current in L2. Moreover the capacitative store can provide a rate of initial current build-up greater than that obtainable from the inductive store, which is advantageous in certain applications.

In one embodiment the load L2 is an experimental gas discharge apparatus having an effective inductance of 8.25 mh. The nature of the experiment requires the initial transfer of 25 mj. of energy to L2 from a capacitor, followed by the transfer of about 150 mj. for which an inductive store is suitable. The initial 25 mj. is provided by a capacitor bank (C1) totalling 1250 μf. with a working voltage of 200 kv., and the further 150 mj. from an inductance (L1) of 20 mh. storing 289 mj. at 170 ka.

The timing sequence with this embodiment is as follows. Assuming C1 and L1 to be charged, S4 is closed at time $t3$ in FIG. 3(a) to discharge C1 into L2. With the values given above, C1 resonating with L2 has a period of 20 millisecs, so S2 is closed 5 millisecs later at time $t4$. At this time the current $I_{L2}$ has reached a peak value of 78 ka. and C1 is discharged. The current in CB1 is $170 - 78$ ka. $= 92$ ka.

Immediately thereafter CB1 is opened and C1 resonates with L1 and L2 in parallel with a period of 17 milliseconds. The voltage on C1 rises to a peak value of 199 kv., i.e. within the rating of the capacitor bank. At time $t2$, 8.5 milliseconds after $t1$, S3 is closed leaving $$I_{L1} = 116 \text{ ka. and } I_{L2} = 208 \text{ ka.}$$

i.e. $I_{L1}$ has dropped by 54 ka. and $I_{L2}$ has risen by 130 ka. During the 8.5 millisecond transfer period the energy stored in L1 has fallen from 289 mj. to 135 mj., and the energy stored in L2 has risen from 25 mj. to 179 mj. The energy transferred is 154 mj., which is more than six times the energy rating of the transfer capacitor C1.

The duty of the circut-breaker CB1 in the circuit of FIG. 3 is reduced as compared with that of FIGS. 1 or 2, since it can now break quickly at a low voltage with a relatively slow rise of voltage thereafter. Moreover it is possible to delay the closure of S2 until a time $t5$ when CB1 has just started to open, thus allowing C1 to charge slightly in the reverse direction as shown dotted in FIG. 3(a). C1 then injects a pulse of current in the reverse direction through CB1 and thus enables it to break the current at a current zero point. An alternative arrangement for easing the duty of CB1 is described hereinafter with reference to FIGS. 8, 8(a) and 9.

Apart from any initial use as a capacitative store, the peak energy requirement, $E_{C1}$, of the capacitor C1 in transferring energy from L1 to L2 can be shown to be $$E_{C1} = \text{energy transferred} \times \tfrac{1}{4}\left(\frac{k2-1}{k2+1} + \frac{k1-1}{k1+1}\right) \quad \text{(i)}$$

where
$k1$ = ratio of initial to final current in L1.
$k2$ = ratio of final to initial current in L2.

The initial current in L2, if any, can be produced by other means than discharging C1 through L2.

It will be seen from the above equation that the size of capacitor required is largest when $I_{L2}$ is initially zero and $I_{L1}$ is finally zero. The peak capacitor energy $E_{C1}$ is then half the energy to be transferred.

Since $k1$ can be controlled to give the most economical total cost for C1 and L1, it is convenient to express Equation i in terms of $k2$ and $n$, where $$n^2 = \frac{\text{initial energy of } L1}{\text{energy transferred}}$$

This gives $$E_{C1} = \text{energy transferred} \times \tfrac{1}{4}\left(\frac{k2-1}{k2+1} + 2n^2 - 1 - 2n\sqrt{n^2-1}\right)$$

(ii)

Figure 4:
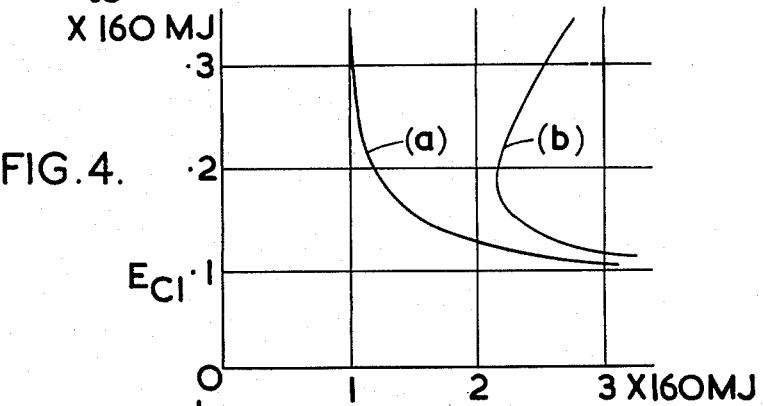
FIG. 4 is a graph relating capacitor and inductor sizes for a given duty in the circuit of FIG. 3.

Curve (a) in FIG. 4 is a curve plotted from Equation ii of capacitor energy against peak stored energy in the inductor where the transferred enrgy is 160 mj. and $k2 = 2$. Assuming the relative costs per joule of capacitative and inductive storage are known, optimum sizes can then be chosen to give minimum total cost. If, for example, these costs are in the ratio 5:1, curve (b) in FIG. 4, which is a plot of $E_{C1}$ against $E_{L1} + 5E_{C1}$, shows that the optimum capacitor size is approximately 29 mj. and the inductor 200 mj. The inductive storage cost is determined by a correct proportioning of the inductor cost to the D.C. source and charging switch gear.

FIG. 3(a) and the above calculations are for the case where S3 is closed at time $t2$. It is also possible, if only a transient transfer of energy is required, not to re-close the circuit (or to break it again after an interval) and let the energy transfer back from L2 to L1. This involves a reversal of the circuit voltage, and it may therefore be worthwhile reversing the connections to capacitor C1 in the interval (if any) to limit the total voltage excursion and rating of the capacitor. In this way two identical intermittently operating inductive circuits (e.g. thermonuclear reactors based on apparatus of the kind described in the aforementioned specification) could each act as an inductive store for the other, or $n$ such machines with a $1/n$ duty cycle and suitable switch gear could each act as the store for the next in the cycle, with suitable provision for making up the system losses.

A resistor having a high positive temperature coefficient PTC may be provided and connected in parallel with said first capacitor C1.

In FIG. 3 the resonant circuit is undamped. Where the load has a resistive component and in special cases where it is desired to introduce a resistor in parallel with C1, a circuit in accordance with the invention will still give the advantage of greater utilisation of the storage inductor energy and reduced energy losses during the transfer (as compared with the resistive circuit transfer of FIG. 2) so long as the damping is less than the critical value, i.e. so long as the capacitor voltage will reverse if switch S3 is not closed at the end of the energy transfer period. One case where it may be desired to use a resistor in parallel with C1 is that of a resistor of variable value (e.g. one which increases greatly in value due to heating during the transfer cycle). This would carry a lower current at any given voltage in the later part of the cycle when the voltage is falling, than in the earlier part when the voltage is rising, and thus give the effect of a capacitor in parallel with a resistor. In some cases the consequent reduction in size of C1 required may justify the additional energy losses in the resistor.

Figure 5:
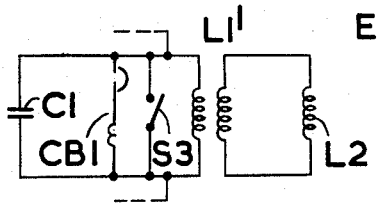
FIG. 5 shows a modified form of the circuit of FIG. 3.
Figure 6:
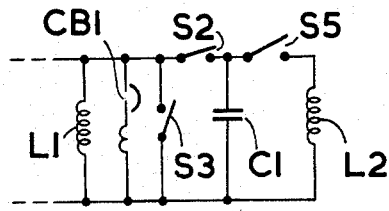
FIGS. 6 and 6(a) show respectively another circuit according to the invention and waveforms in that circuit.
Figure 6A:
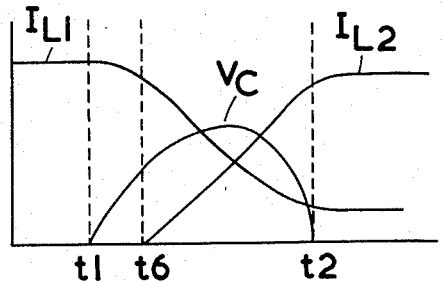

The modification of the circuit of FIG. 3 shown in FIG. 5 can be used where the ratio between voltage and current in L2 is not convenient for CB1 and C1. The storage inductor is now the transformer L1', the secondary winding of which is connected to the load L2. The small leakage inductance between primary and secondary does not affect the operation of the circuit and appears in effect as an additional load inductance. Other uses of such double-wound storage inductors may be to have the capacitor C1 (or a portion of it) and the circuit breaker CB1 on different windings from the charging circuit. Clearly many combinations are possible.

Where a more rapid initial rise of current is required by the load characteristics, it is possible to modify the basic circuit of FIG. 3 (omitting S4 and B2) as shown in FIG. 6, by including a switch S5 between C1 and L2. The switch S5 is closed at a time $t6$ (FIG. 6($a$)) when the voltage across C1 has risen to a suitable value. This modification is at the expense of some of the economy in capacitor size.

Figure 7:
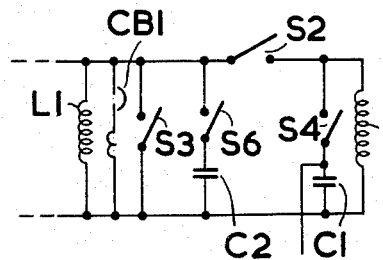
FIGS. 7 and 7(a) show respectively yet another circuit according to the invention and waveforms in that circuit.
Figure 7A:
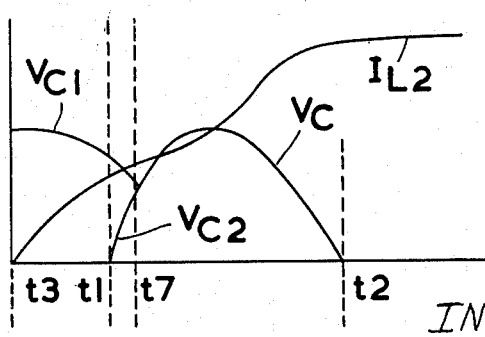

In FIGS. 7 and 7($a$) the circuit of FIGS. 3 and 3($a$) (including S4 and B2) is modified to provide a more rapid initial rise of current from the inductive store in a manner similar to the circuit of FIGS. 6 and 6($a$). A further capacitor C2 is connected across CB1 via a switch S6 which is closed prior to opening CB1 and the switch sequence is timed so that SB1 opens at time $t1$ before $V_{C1}$ has fallen to zero. S2 closes shortly thereafter at time $t7$ when $V_{C1} \cong V_{C2}$. C2 is provided to ease the switching duty of CB1.

We claim:

1. An energy transfer circuit comprising a storage inductor, source means connectable across the storage inductor for charging the storage inductor, first switch means connected to short-circuit said storage inductor when said storage inductor has been charged, an inductive load, a capacitor, means for connecting selectively said inductive load and the capacitor in parallel to form a resonant circuit, said connecting means including second switch means for isolating the capacitor from the inductive load and third switch means for isolating said inductive load from said storage inductor when said storage inductor is being charged, and control means for operating said switch means so that when said storage inductor is charged said first switch means is opened and said third switch means is then closed thereby transferring energy to the inductive load.

2. A circuit as claimed in claim 1 and further comprising means for establishing an initial current in said inductive load, said means including a source for charging said capacitor and second control means for closing said second switch means to cause said capacitor to discharge into the inductive load.

References Cited by the Examiner

UNITED STATES PATENTS

| 2,157,929 | 5/39 | Troger | 307—108 |
| 2,276,796 | 3/42 | Rogers | 318—104 |
| 2,276,851 | 3/42 | Livingston | 307—104 |

LLOYD McCOLLUM, *Primary Examiner.*

MILTON O. HIRSHFIELD, *Examiner.*